United States Patent
Tong

(10) Patent No.: US 11,058,993 B2
(45) Date of Patent: Jul. 13, 2021

(54) DRY DESULFURIZING AND DENITRIFICATING AGENT, AND ITS PREPARATION METHOD AND APPLICATIONS

(71) Applicant: Environment Sustainable System Engineering Technology Co., Ltd., Beijing (CN)

(72) Inventor: Shanghui Tong, Beijing (CN)

(73) Assignee: Environment Sustainable System Engineering Technology Co., Ltd., Beijing (CN)

( * ) Notice: Subject to any disclaimer, the term of this patent is extended or adjusted under 35 U.S.C. 154(b) by 0 days.

(21) Appl. No.: 16/650,791

(22) PCT Filed: Aug. 29, 2018

(86) PCT No.: PCT/CN2018/103025
§ 371 (c)(1),
(2) Date: Mar. 25, 2020

(87) PCT Pub. No.: WO2019/062449
PCT Pub. Date: Apr. 4, 2019

(65) Prior Publication Data
US 2020/0230551 A1    Jul. 23, 2020

(30) Foreign Application Priority Data
Sep. 30, 2017 (CN) .......................... 201710938332.8

(51) Int. Cl.
*B01D 53/86* (2006.01)
*B01D 53/82* (2006.01)

(52) U.S. Cl.
CPC .......... *B01D 53/8637* (2013.01); *B01D 53/82* (2013.01); *B01D 2251/402* (2013.01); *B01D 2251/602* (2013.01); *B01D 2255/20707* (2013.01); *B01D 2255/20715* (2013.01); *B01D 2255/40* (2013.01); *B01D 2255/9202* (2013.01); *B01D 2258/0283* (2013.01)

(58) Field of Classification Search
CPC ............ B01D 53/1456; B01D 53/1481; B01D 53/508; B01D 53/565; B01D 53/81; B01D 2251/00; B01D 2251/602; B01D 2252/10; B01D 2252/504; B01D 2253/1124; B01D 2257/302; B01D 2257/402; B01D 2257/404; B01D 2258/0283; B01J 8/00; B01J 20/06; B01J 20/00; B01J 20/30
See application file for complete search history.

(56) References Cited

U.S. PATENT DOCUMENTS 4,254,616 A * 3/1981 Siminski ................ B01D 46/32
                                                      204/155

FOREIGN PATENT DOCUMENTS

| CN | 1597094 A | 3/2005 |
|----|-----------|--------|
| CN | 101954284 A | 1/2011 |
| CN | 102527369 A | 7/2012 |
| CN | 102824844 A | 12/2012 |
| CN | 103301749 A | 9/2013 |
| CN | 106512980 A | 3/2017 |
| CN | 107497295 A | 12/2017 |
| CN | 107694576 A | 2/2018 |

OTHER PUBLICATIONS

International Search Report issued in International Application No. PCT/CN2018/103025 dated Nov. 12, 2018 (5 pages).
Written Opinion issued in International Application No. PCT/CN2018/103025 dated Nov. 12, 2018 (4 pages).
Office Action issued in corresponding CN Application No. 20170938332.8 dated Mar. 21, 2019 (5 pages).

* cited by examiner

*Primary Examiner* — Timothy C Vanoy
(74) *Attorney, Agent, or Firm* — Osha Bergman Watanabe & Burton LLP

(57) ABSTRACT

The present disclosure discloses a dry desulfurizing and denitrificating agent and its preparation method and applications. The desulfurizing and denitrificating agent is made of raw materials comprising the following components based on 100 parts by weight of the desulfurizing and denitrificating agent: 30-60 parts by weight of $TiO_2$, 10-30 parts by weight of $ZrO_2$, 2-10 parts by weight of $V_2O_5$, 2-10 parts by weight of CoO, 1-8 parts by weight of $Co_2O_3$, 2-10 parts by weight of $Fe_2O_3$, 5-15 parts by weight of $MnO_2$, and 2-10 parts by weight of $KMnO_4$. The desulfurizing and denitrificating agent of the present disclosure has a good catalytic oxidation performance on sulfur dioxide and nitrogen oxides of flue gas, and a high rate of desulfurization and denitrification.

10 Claims, No Drawings

DRY DESULFURIZING AND DENITRIFICATING AGENT, AND ITS PREPARATION METHOD AND APPLICATIONS

TECHNICAL FIELD OF THE DISCLOSURE

The present disclosure relates to a dry desulfurizing and denitrificating agent, and its preparation method and applications, especially for dry desulfurization and denitrification of flue gas.

BACKGROUND OF THE DISCLOSURE

As world economy, industrialization and urbanization continue to expand, emission of flue gas increases year after year. Therefore, air pollution has become one of the most serious problems in the 21st century. Acidification of industrial waste gas results in environmental acidification, so it is one of main reasons for air pollution. Environmental acidification is caused by $SO_2$ and $NO_x$ with its main form of acid rain. In the 1960s, the environment of many industrial developed areas was affected by industrial waste gas. The pH value of precipitation in these areas dropped below 5, then the area of pollution expanded continually, with serious destruction of ecological environment. Since the beginning of the 21st century, China's economy has developed rapidly, but its exhaust gas amount in the world is also high. The environmental pollution of industrial cities is increasingly intensifying.

In view of this, there is a need to develop a reliable technology for desulfurization and denitrification of flue gas. CN101954284A discloses a method for preparing an active carbon desulfurization catalyst, comprising the following steps: mixing copper compounds, iron compounds, cobalt compounds and zinc compounds, then dispersing active carbon in the solution, and finally obtaining a desulfurizing catalyst. The catalyst has a high desulfurization rate. However, the preparation method is quite complicated, and requires many kinds of raw materials. Especially this disclosure does not mention whether the catalyst has the ability to remove nitrogen oxides. CN102527369A discloses a method for preparing a reduction denitrification catalyst, which comprises a rare earth metal oxide supported on active carbon, wherein the active carbon is used as a catalyst support; cerium or two components of lanthanum and cerium, the rare earth metal(s), are used as an active component, so that nitrogen oxides are reduced. The denitrification rate may reach above 95% at a relatively high GHSV. However, this disclosure does not mention whether the catalyst can perform desulfurization. In addition, in the catalyst, the rare earth metal compounds with high price are used as an active component, leading to an increased cost. CN1597094A discloses a method for preparing an active carbon based catalyst for desulfurization and denitrification with a honeycomb shape, comprising the following steps: adding phenolic resin or furan resin (as an adhesive) into the active carbon powder, die-pressing and then charring; immersing in the mixed solution of ammonium metavanadate and oxalic acid; drying, calcining and oxidizing to obtain the catalyst. The catalyst has a desulfurization capacity of 67-90 mg $SO_2$/100 g catalyst, a NO conversion of 55-90%. But there is still room for improvement.

SUMMARY OF THE DISCLOSURE

An object of the present disclosure is to provide a dry desulfurizing and denitrificating agent, which has a high rate of desulfurization and denitrification. It requires no rare earth metal, and thus it has a low cost.

Another object of the present disclosure is to provide a method for preparing a dry desulfurizing and denitrificating agent, which has a simple process with energy saving and environmental protection.

A further object of the present disclosure is to provide a method for dry desulfurization and denitrification of flue gas, which may improve the performance of a desulfurizing and denitrificating agent.

The following technical solution is utilized in the present disclosure to achieve the objects above.

The present disclosure provides a dry desulfurizing and denitrificating agent, which is made of raw materials comprising the following components based on 100 parts by weight of the desulfurizing and denitrificating agent:

| | |
|---|---|
| $TiO_2$ | 30-60 parts by weight, |
| $ZrO_2$ | 9-30 parts by weight, |
| $V_2O_5$ | 2-10 parts by weight, |
| CoO | 2-10 parts by weight, |
| $Co_2O_3$ | 1-8 parts by weight, |
| $Fe_2O_3$ | 2-10 parts by weight, |
| $MnO_2$ | 5-15 parts by weight, and |
| $KMnO_4$ | 2-10 parts by weight. |

According to the desulfurizing and denitrificating agent of the present disclosure, preferably, the desulfurizing and denitrificating agent is made of raw materials comprising the following components based on 100 parts by weight of the desulfurizing and denitrificating agent:

| | |
|---|---|
| $TiO_2$ | 35-60 parts by weight, |
| $ZrO_2$ | 10-20 parts by weight, |
| $V_2O_5$ | 6-10 parts by weight, |
| CoO | 2.5-7 parts by weight, |
| $Co_2O_3$ | 1.5-6 parts by weight, |
| $Fe_2O_3$ | 3-8 parts by weight, |
| $MnO_2$ | 6-12 parts by weight, and |
| $KMnO_4$ | 3-8 parts by weight. |

According to the desulfurizing and denitrificating agent of the present disclosure, preferably, the desulfurizing and denitrificating agent is made of raw materials comprising the following components based on 100 parts by weight of the desulfurizing and denitrificating agent:

| | |
|---|---|
| $TiO_2$ | 50-52 parts by weight, |
| $ZrO_2$ | 10-15 parts by weight, |
| $V_2O_5$ | 8-10 parts by weight, |
| CoO | 3-6 parts by weight, |
| $Co_2O_3$ | 3-5 parts by weight, |
| $Fe_2O_3$ | 6-8 parts by weight, |
| $MnO_2$ | 7-9.5 parts by weight, and |
| $KMnO_4$ | 5-8 parts by weight. |

According to the desulfurizing and denitrificating agent of the present disclosure, preferably, $TiO_2$ and $ZrO_2$ are used as a support; $V_2O_5$, CoO, $Co_2O_3$, $Fe_2O_3$, $MnO_2$ and $KMnO_4$ are used as an active component.

According to the desulfurizing and denitrificating agent of the present disclosure, preferably, the desulfurizing and denitrificating agent has an average particle size of 0.8-15 μm.

The present disclosure also provides a method for preparing the above desulfurizing and denitrificating agent, comprising the following steps:

(1) adding $V_2O_5$, CoO, $Co_2O_3$, $Fe_2O_3$, $MnO_2$ and $KMnO_4$ into a slurry containing $TiO_2$ and $ZrO_2$, stirring the slurry at a rotating rate of 100-300 rpm for 10-60 h, so as to obtain a mixed slurry; wherein $TiO_2$, $ZrO_2$, $V_2O_5$, CoO, $Co_2O_3$, $Fe_2O_3$ and $MnO_2$ are all nano oxides;

(2) adding aqueous ammonia with a concentration of 2-19 wt % into the mixed slurry under the action of ultrasonic wave with a vibration frequency of 15-200 kHz until the pH value of the reaction system reaches 7-9.5; after continuous stirring for 2-6 h, dripping potassium permanganate solution until pH value of the reaction system reaches 4-6, and continuing stirring for 2-6 h, vacuum filtrating, and water washing to obtain a paste;

(3) drying the paste at 100-130° C., and grinding into small particles; calcining the small particles at 350-1000° C. for 2-6 h, so as to obtain the desulfurizing and denitrificating agent.

According to the preparation method of the present disclosure, preferably, in step (2), the adding rate of aqueous ammonia is 0.2-20 mL/min.

According to the preparation method of the present disclosure, preferably, in step (2), the dripping rate of potassium permanganate solution is 0.2-20 mL/min.

The present disclosure further provides a method for dry desulfurization and denitrification of flue gas. Flue gas is fully contacted with the desulfurizing and denitrificating agent, and then contacted with the dry absorbent powder containing magnesium oxide, so as to remove nitrogen oxides and sulfur dioxide in the flue gas; the magnesium oxide contains 70-85 wt % of active magnesium oxide, and the magnesium oxide has a content of nano magnesium oxides of 10-20 wt %.

According to the method of the present disclosure, preferably, before contacting with the desulfurizing and denitrificating agent, the flue gas has a content of sulfur dioxide of 1000-3000 $mg/Nm^3$ and a content of nitrogen oxides of 100-600 $mg/Nm^3$, a flow velocity of 2-5 m/s, and a temperature of 110-170° C.

The dry desulfurizing and denitrificating agent of the present disclosure may convert nitrogen oxides with low valence into nitrogen oxides with high valence, such as nitrogen dioxide, and may convert sulfur dioxide into sulfur trioxides by oxidization. And then the product is absorbed with an absorbent such as magnesium oxide, so as to realize desulfurization and denitrification. The desulfurizing and denitrificating agent has a good desulfurization and denitrification performance, with low energy consumption and low cost.

DETAIL DESCRIPTION OF THE DISCLOSURE

The present disclosure will be further explained in combination with specific embodiments, but the protection scope of the present disclosure is not limited thereto.

In the present disclosure, "nano" refer to 1-100 nm, preferably 10-60 nm.

<Dry Desulfurizing and Denitrificating Agent>

The desulfurizing and denitrificating agent of the present disclosure is a desulfurizing and denitrificating catalyst. The desulfurizing and denitrificating agent may comprise a support and an active component. The support may be nano amphoteric oxides, preferably, a combination of $TiO_2$ and $ZrO_2$. The active component comprises nano metal oxides and $KMnO_4$. The nano metal oxides comprise $V_2O_5$, CoO, $Co_2O_3$, $Fe_2O_3$ and $MnO_2$. These active components are carried on the support, so as to form a desulfurizing and denitrificating agent. Coordination of these active components converts sulfur dioxide into sulfur trioxide by oxidization, and converts nitrogen oxides with low valence (NO) into $NO_2$ and the like by catalytic oxidation. Such a combination may fully realize the catalytic oxidation, which may further improve the performance of desulfurization and denitrification.

In the present disclosure, vanadium, cobalt, iron and manganese are used as active components of the desulfurizing and denitrificating agent, and present in the form of $V_2O_5$, CoO, $Co_2O_3$, $Fe_2O_3$ and $MnO_2$, which may provide active sites for catalytic reactions, adsorb reactants of $SO_2$ and NO, and further promote the reaction.

Ti is present in the form of $TiO_2$, which acts as the main support for active components. Ti also adsorbs NO, which increases the possibility of adsorbing reactants on the surface of the desulfurizing and denitrificating agent. When a combination of $ZrO_2$ and $TiO_2$ is used together as a support, Zr may occupy the sites of Ti in the original lattice, resulting in $ZrTiO_4$. Then, the support shows new acidity and alkalinity. When $SO_2$ and NO occupy sites of the desulfurizing and denitrificating agent, these alkaline sites may absorb $SO_2$ and NO, resulting in occupied target sites, so as to effectively protect the active sites of active components.

In accordance to one embodiment of the present disclosure, based on 100 parts by weight of the desulfurizing and denitrificating agent, the desulfurizing and denitrificating agent comprises: 30-60 parts by weight of $TiO_2$, 9-30 parts by weight of $ZrO_2$, 2-10 parts by weight of $V_2O_5$, 2-10 parts by weight of CoO, 1-8 parts by weight of $Co_2O_3$, 2-10 parts by weight of $Fe_2O_3$, 5-15 parts by weight of $MnO_2$, and 2-10 parts by weight of $KMnO_4$. Preferably, the desulfurizing and denitrificating agent comprises: 35-60 parts by weight of $TiO_2$, 10-20 parts by weight of $ZrO_2$, 6-10 parts by weight of $V_2O_5$, 2.5-7 parts by weight of CoO, 1.5-6 parts by weight of $Co_2O_3$, 3-8 parts by weight of $Fe_2O_3$, 6-12 parts by weight of $MnO_2$, and 3-8 parts by weight of $KMnO_4$. More preferably, the desulfurizing and denitrificating agent comprises: 50-52 parts by weight of $TiO_2$, 10-15 parts by weight of $ZrO_2$, 8-10 parts by weight of $V_2O_5$, 3-6 parts by weight of CoO, 3-5 parts by weight of $Co_2O_3$, 6-8 parts by weight of $Fe_2O_3$, 7-9.5 parts by weight of $MnO_2$, and 5-8 parts by weight of $KMnO_4$. It may significantly improve the oxidation performance of active components on sulfur dioxide and nitrogen oxides with low valence in flue gas by controlling the contents of active components within the above range, so as to improve the desulfurization and denitrification performance. In the present disclosure, the desulfurizing and denitrificating agent is made of raw materials comprising $TiO_2$, $ZrO_2$, $V_2O_5$, CoO, $Co_2O_3$, $Fe_2O_3$, $MnO_2$ and $KMnO_4$ above. In accordance to one preferred embodiment of the present disclosure, the desulfurizing and denitrificating agent is made of raw materials consisting of $TiO_2$, $ZrO_2$, $V_2O_5$, CoO, $Co_2O_3$, $Fe_2O_3$, $MnO_2$ and $KMnO_4$.

The desulfurizing and denitrificating agent of the present disclosure has an average particle size of 0.8-15 μm, preferably 1-5 μm. The average particle size may be obtained by the sieving method. In the finished desulfurizing and denitrificating agent, $V_2O_5$, CoO, $Co_2O_3$, $Fe_2O_3$ and $MnO_2$ have a particle size of 2-100 nm and a specific surface area of 100-300 $m^2$/g.

<Preparation Method>

The desulfurizing and denitrificating agent of the present disclosure may be prepared with nano metal oxides. Firstly, nano metal oxides of $V_2O_5$, CoO, $Co_2O_3$, $Fe_2O_3$ and $MnO_2$ are prepared. Common methods include sol-gel method, hydrolysis method, hydrothermal synthesis method and so on. Sol-gel method is preferred. For example, solutions of nitrates of vanadium, cobalt, iron and manganese are used as a precursor. These nitrates are hydrolyzed in the solution and condensed to sol solutions, respectively, and then converted into gels by heating and removing solvents, and finally, nano metal oxides with controllable crystal structure and particle size, and high uniformity of particle size are obtained. These methods are well known in the art, and will not be described herein.

The preparation method of the present disclosure comprises (1) mixing step; (2) reaction step; (3) drying and calcining step, and the like.

In the mixing step of the present disclosure, $V_2O_5$, CoO, $Co_2O_3$, $Fe_2O_3$, $MnO_2$ and $KMnO_4$ are added into a slurry containing $TiO_2$ and $ZrO_2$, and the slurry are stirred at a rotating rate of 100-300 rpm for 10-60 h, so as to obtain a mixed slurry. Preferably, the rotating rate is 200-250 rpm; the stirring time is 10-48 h. In accordance to one embodiment of the present disclosure, $TiO_2$, $ZrO_2$, $V_2O_5$, CoO, $Co_2O_3$, $Fe_2O_3$ and $MnO_2$ are all nano oxides.

The reaction step of the present disclosure comprises: adding aqueous ammonia with a concentration of 2-19 wt %, preferably 5-10 wt % into the mixed slurry under the action of ultrasonic wave with a vibration frequency of 15-200 kHz, preferably 50-100 kHz until pH value of the reaction system reaches 7-9.5, such as 7-8; after continuous stirring for 2-6 h, preferably 2-3 h, dripping potassium permanganate solution until pH value of the reaction system reaches 4-6, such as 5-5.5, and continuing stirring for 2-6 h, preferably 2-3 h, vacuum filtrating, and water washing to obtain a paste. The adding rate of aqueous ammonia may be 0.2-20 mL/min, preferably 3-10 mL/min; the dripping rate of potassium permanganate solution is 0.2-20 mL/min, preferably 1-5 mL/min. This is favorable to obtain nano metal oxides with uniform size. Preferably, potassium permanganate solution used in the present disclosure is acidic potassium permanganate solution.

The drying and calcining step of the present disclosure comprises: drying the paste at 100-130° C., such as 105-110° C., to obtain a dried product; and grinding the dried product into small particles. Calcining the small particles at a temperature of 350-1000° C., preferably 500-800° C. for 2-6 h, such as 2-3 h, so as to obtain the desulfurizing and denitrificating agent.

<Method for Dry Desulfurization and Denitrification of Flue Gas>

The method for dry desulfurization and denitrification of flue gas of the present disclosure comprises a flue gas desulfurization and denitrification step. In the flue gas desulfurization and denitrification step, flue gas is fully contacted with the above desulfurizing and denitrificating agent, and then contacted with a dry absorbent powder containing magnesium oxide, so as to remove sulfur dioxide and nitrogen oxides in the flue gas.

In the method of the present disclosure, the flue gas may have a content of sulfur dioxide of 1000-3000 mg/Nm³, preferably 1500-2500 mg/Nm³, more preferably 1600-2000 mg/Nm³. The flue gas may have a content of nitrogen oxides of 100-600 mg/Nm³, preferably 150-500 mg/Nm³, more preferably 300-450 mg/Nm³. The flue gas may have a content of oxygen of 10-25 vol %, preferably 15-20 vol %. The temperature may be 110-170° C.; preferably 120-135° C. In addition, the flue gas may have a flow velocity of 2-5 m/s, preferably 2.5-3.5 m/s. All the above parameters of flue gas indicate parameters of the flue gas at inlet; while parameters of the flue gas at outlet are determined according to the actual situation of desulfurization and denitrification. The above process parameters are favorable to improve the rate of desulfurization and denitrification. The flue gas is fully contacted with the desulfurizing and denitrificating agent to convert nitrogen oxides with low valence into nitrogen dioxide and the like, and convert sulfur dioxide into sulfur trioxide in the flue gas, so as to obtain pre-treated flue gas.

The magnesium oxide of the present disclosure may comprise light burned magnesium oxides, micro magnesium oxides and/or nano magnesium oxides. In accordance to one embodiment of the present disclosure, the magnesium oxide comprises 70-85 wt % of active magnesium oxide, preferably 80-85% of active magnesium oxide; and the magnesium oxide has a content of nano magnesium oxide of 10-2 0wt %, preferably 15-20 wt %. Due to some unique properties of nanoparticles, the rate of desulfurization and denitrification may be improved by using nano magnesium oxides. This is more favorable to obtain magnesium nitrate and magnesium sulfate, so as to improve the effect of desulfurization and denitrification of flue gas. In the present disclosure, the absorbent may only comprise the above-mentioned magnesium oxides. The absorbent may also comprise a modifier, such as calcium oxide and silica. The modifier is a micro/nano metal oxide. In order to improve the removal efficiency, the absorbent of the present disclosure is in the form of powder. The powder may have a particle size of 0.8-15 μm, preferably 1-5 μm. This may directly mix the absorbent with the flue gas, so as to remove sulfur dioxide and nitrogen oxides from the flue gas. As a result, the desulfurization and denitrification of flue gas may be performed with no need of a large amount of industrial waste water, and without generating a large amount of industrial waste liquid. For example, the dry absorbent powder and the pre-treated flue gas are fully mixed in the pipeline for flue gas, and then the mixture enters the absorption tower for desulfurization and denitrification treatment. The flue gas after desulfurization and denitrification is discharged from the chimney.

Examples 1

A desulfurizing and denitrificating agent was prepared according to the formula in Table 1. $V_2O_5$, CoO, $Co_2O_3$, $Fe_2O_3$, $MnO_2$ (all of these compounds are nano metal oxides) and $KMnO_4$ were added into a slurry containing $TiO_2$ and $ZrO_2$. The slurry was stirred at a rotating rate of 250 rpm for 45 h, so that a mixed slurry was obtained. Aqueous ammonia with a concentration of 10 wt % was added into the mixed slurry under the action of ultrasonic wave with a vibration frequency of 70 kHz until the pH value of the reaction reached 7; after continuous stirring for 3 h, potassium permanganate solution was added dropwise until pH value of the reaction system reached 5, and the stirring was continued for 2 h. Then the reaction was vacuum-filtrated and washed by water to obtain a paste. The adding rate of aqueous ammonia was 5 mL/min; the dripping rate of potassium permanganate solution was 2 mL/min. The paste was dried at 100° C., and ground into small particles; the small particles were calcined at 500° C. for 3 h, so as to obtain the desulfurizing and denitrificating agent H1.

TABLE 1

| The formula of the desulfurizing and denitrificating agent H1 | |
|---|---|
| $TiO_2$ | 56.0 parts by weight, |
| $ZrO_2$ | 15.0 parts by weight, |

TABLE 1-continued

The formula of the desulfurizing and denitrificating agent H1

| | |
|---|---|
| $V_2O_5$ | 4.0 parts by weight, |
| CoO | 5.0 parts by weight, |
| $Co_2O_3$ | 5.0 parts by weight, |
| $Fe_2O_3$ | 3.0 parts by weight, |
| $MnO_2$ | 7.0 parts by weight, and |
| $KMnO_4$ | 5.0 parts by weight. |

Catalytic oxidation was performed on flue gas with this desulfurizing and denitrificating agent. Absorption was performed with dry powder of magnesium oxides. The flue gas had a flow velocity of 2.5 m/s. Other parameters of the flue gas at inlet and parameters of the flue gas at outlet were showed in Tables 2 and 3.

TABLE 2

Parameters of the flue gas at inlet

| No. | Parameters | Units | Values |
|---|---|---|---|
| 1 | Flow velocity of flue gas at inlet (working conditions) | $m^3/h$ | 120000 |
| 2 | Flow velocity of flue gas at inlet (standard conditions) | $Nm^3/h$ | 80294 |
| 3 | Temperature of flue gas at inlet | ° C. | 135 |
| 4 | $SO_2$ content at inlet | $mg/Nm^3$ | 2000 |
| 5 | Nitrogen monoxide content at inlet | $mg/Nm^3$ | 450 |
| 6 | Humility content in the flue gas | % | 5.7 |

TABLE 3

Parameters of the flue gas at outlet

| No. | Items | Number | Units |
|---|---|---|---|
| 1 | Flow velocity of flue gas at outlet (working conditions) | 42353 | $m^3/h$ |
| 2 | Temperature of flue gas at outlet | 65 | ° C. |
| 3 | Sulfur dioxide content of discharged flue gas | 23 | $mg/Nm^3$ |
| 4 | Desulfurization rate | 99.51 | % |
| 5 | Nitrogen oxides content of discharged flue gas | 50 | $mg/Nm^3$ |
| 6 | Denitrification rate | 96 | % |
| 7 | Output of by-product | 5.34 | t/h |

After purification, the flue gas had a content of sulfur dioxide of 23 $mg/Nm^3$, a content of nitrogen oxides of 50 $mg/Nm^3$. The desulfurization rate reached 99.51%, and the denitrification rate was 96%.

Examples 2

The desulfurizing and denitrificating agent H2 was prepared according to the formula in Table 4, while other conditions were the same as those in Example 1. Catalytic oxidation was performed on flue gas with this desulfurizing and denitrificating agent. Absorption was performed with dry powder of magnesium oxides. Parameters of the flue gas at inlet were the same as those in Example 1. Parameters of the flue gas at outlet were showed in Table 5.

TABLE 4

The formula of the desulfurizing and denitrificating agent H2

| | |
|---|---|
| $TiO_2$ | 52.0 parts by weight, |
| $ZrO_2$ | 15.0 parts by weight, |

TABLE 4-continued

The formula of the desulfurizing and denitrificating agent H2

| | |
|---|---|
| $V_2O_5$ | 6.0 parts by weight, |
| CoO | 5.0 parts by weight, |
| $Co_2O_3$ | 5.0 parts by weight, |
| $Fe_2O_3$ | 5.0 parts by weight, |
| $MnO_2$ | 7.0 parts by weight, and |
| $KMnO_4$ | 5.0 parts by weight. |

TABLE 5

Parameters of the flue gas at outlet

| No. | Items | Number | Units |
|---|---|---|---|
| 1 | Flow velocity of flue gas at outlet (working conditions) | 41341 | $m^3/h$ |
| 2 | Temperature of flue gas discharged | 65 | ° C. |
| 3 | Sulfur dioxide content of discharged flue gas | 19 | $mg/Nm^3$ |
| 4 | Desulfurization rate | 99.60 | % |
| 5 | Nitrogen oxides content of discharged flue gas | 43 | $mg/Nm^3$ |
| 6 | Denitrification rate | 96.02 | % |
| 7 | Output of by-product | 5.43 | t/h |

After purification, the flue gas had a content of sulfur dioxide of 19 $mg/Nm^3$, a content of nitrogen oxides of 43 $mg/Nm^3$. The desulfurization rate reached 99.60%, and the denitrification rate was 96.02%.

Examples 3

The desulfurizing and denitrificating agent H3 was prepared according to the formula in Table 6, while other conditions were the same as those in Example 1. Catalytic oxidation was performed on flue gas with this desulfurizing and denitrificating agent. Absorption was performed with dry powder of magnesium oxides. Parameters of the flue gas at inlet were the same as those in Example 1. Parameters of the flue gas at outlet were showed in Table 7.

TABLE 6

The formula of the desulfurizing and denitrificating agent H3

| | |
|---|---|
| $TiO_2$ | 48.0 parts by weight, |
| $ZrO_2$ | 15.0 parts by weight, |
| $V_2O_5$ | 8.0 parts by weight, |
| CoO | 5.0 parts by weight, |
| $Co_2O_3$ | 5.0 parts by weight, |
| $Fe_2O_3$ | 7.0 parts by weight, |
| $MnO_2$ | 7.0 parts by weight, and |
| $KMnO_4$ | 5.0 parts by weight. |

TABLE 7

Parameters of the flue gas at outlet

| No. | Items | Number | Units |
|---|---|---|---|
| 1 | Flow velocity of flue gas at outlet (working conditions) | 40324 | $m^3/h$ |
| 2 | Temperature of flue gas discharged | 65 | ° C. |
| 3 | Sulfur dioxide content of discharged flue gas | 13 | $mg/Nm^3$ |
| 4 | Desulfurization rate | 99.73 | % |

TABLE 7-continued

| | Parameters of the flue gas at outlet | | |
|---|---|---|---|
| No. | Items | Number | Units |
| 5 | Nitrogen oxides content of discharged flue gas | 29 | mg/Nm$^3$ |
| 6 | Denitrification rate | 97.39 | % |
| 7 | Output of by-product | 5.7 | t/h |

After purification, the flue gas had a content of sulfur dioxide of 13 mg/Nm$^3$, a content of nitrogen oxides of 29 mg/Nm$^3$. The desulfurization rate reached 99.73%, and the denitrification rate was 97.39%.

The present disclosure is not limited by the above embodiments. Any variation, modification and replacement to the disclosed embodiments which are apparent to those skilled in the art and do not depart from the essence of the present disclosure fall in the scope of the present disclosure.

What is claimed is:

1. A dry desulfurizing and denitrificating agent made of raw materials comprising the following components based on 100 parts by weight of the desulfurizing and denitrificating agent:

| | |
|---|---|
| TiO$_2$ | 30-60 parts by weight, |
| ZrO$_2$ | 9-30 parts by weight, |
| V$_2$O$_5$ | 2-10 parts by weight, |
| CoO | 2-10 parts by weight, |
| Co$_2$O$_3$ | 1-8 parts by weight, |
| Fe$_2$O$_3$ | 2-10 parts by weight, |
| MnO$_2$ | 5-15 parts by weight, and |
| KMnO$_4$ | 2-10 parts by weight. |

2. The desulfurizing and denitrificating agent according to claim 1, wherein the desulfurizing and denitrificating agent is made of raw materials comprising the following components based on 100 parts by weight of the desulfurizing and denitrificating agent:

| | |
|---|---|
| TiO$_2$ | 35-60 parts by weight, |
| ZrO$_2$ | 10-20 parts by weight, |
| V$_2$O$_5$ | 6-10 parts by weight, |
| CoO | 2.5-7 parts by weight, |
| Co$_2$O$_3$ | 1.5-6 parts by weight, |
| Fe$_2$O$_3$ | 3-8 parts by weight, |
| MnO$_2$ | 6-12 parts by weight, and |
| KMnO$_4$ | 3-8 parts by weight. |

3. The desulfurizing and denitrificating agent according to claim 1, wherein the desulfurizing and denitrificating agent is made of raw materials comprising the following components based on 100 parts by weight of the desulfurizing and denitrificating agent:

| | |
|---|---|
| TiO$_2$ | 50-52 parts by weight, |
| ZrO$_2$ | 10-15 parts by weight, |
| V$_2$O$_5$ | 8-10 parts by weight, |
| CoO | 3-6 parts by weight, |
| Co$_2$O$_3$ | 3-5 parts by weight, |
| Fe$_2$O$_3$ | 6-8 parts by weight, |
| MnO$_2$ | 7-9.5 parts by weight, and |
| KMnO$_4$ | 5-8 parts by weight. |

4. The desulfurizing and denitrificating agent according to claim 1, wherein TiO$_2$ and ZrO$_2$ are used as a support; V$_2$O$_5$, CoO, Co$_2$O$_3$, Fe$_2$O$_3$, MnO$_2$ and KMnO$_4$ are used as an active component.

5. The desulfurizing and denitrificating agent according to claim 1, wherein the desulfurizing and denitrificating agent has an average particle size of 0.8-15 μm.

6. A method for preparing the desulfurizing and denitrificating agent according to claim 1, comprising the following steps:
(1) adding V$_2$O$_5$, CoO, Co$_2$O$_3$, Fe$_2$O$_3$, MnO$_2$ and KMnO$_4$ into a slurry containing TiO$_2$ and ZrO$_2$, stirring the slurry at a rotating rate of 100-300 rpm for 10-60 h, so as to obtain a mixed slurry; wherein TiO$_2$, ZrO$_2$, V$_2$O$_5$, CoO, Co$_2$O$_3$, Fe$_2$O$_3$ and MnO$_2$ are all nano oxides;
(2) adding aqueous ammonia with a concentration of 2-19 wt % into the mixed slurry under the action of ultrasonic wave with a vibration frequency of 15-200 kHz until the pH value of the reaction system reaches 7-9.5; after continuous stirring for 2-6 h, dripping potassium permanganate solution until pH value of the reaction system reaches 4-6, and continuing stirring for 2-6 h, vacuum filtrating, and water washing to obtain a paste;
(3) drying the paste at 100-130° C., and grinding into small particles; calcining the small particles at 350-1000° C. for 2-6 h, so as to obtain the desulfurizing and denitrificating agent.

7. The method according to claim 6, wherein the adding rate of aqueous ammonia is 0.2-20 mL/min.

8. The method according to claim 6, wherein the dripping rate of potassium permanganate solution is 0.2-20 mL/min.

9. A method for dry desulfurization and denitrification of flue gas comprising the following steps:
fully contacting flue gas with the desulfurizing and denitrificating agent according to claim 1, and then contacting with the dry absorbent powder containing magnesium oxide, so as to remove nitrogen oxides and sulfur dioxide in the flue gas;
wherein the magnesium oxide contains 70-85 wt % of active magnesium oxide, and the magnesium oxide has a content of nano magnesium oxides of 10-20 wt %.

10. The method according to claim 9, wherein before contacting with the desulfurizing and denitrificating agent, the flue gas has a content of sulfur dioxide of 1000-3000 mg/nm$^3$ and a content of nitrogen oxides of 100-600 mg/nm$^3$, a flow velocity of 2-5 m/s, and a temperature of 110-170° C.

* * * * *